US012184920B2

United States Patent
Hosoda et al.

(10) Patent No.: US 12,184,920 B2
(45) Date of Patent: Dec. 31, 2024

(54) VIDEO DISTRIBUTING DEVICE, VIDEO DISTRIBUTING METHOD, AND RECORDING MEDIA

(71) Applicant: DWANGO Co., Ltd., Tokyo (JP)

(72) Inventors: Koji Hosoda, Tokyo (JP); Naoya Matsunaga, Tokyo (JP); Ayaka Ujiie, Tokyo (JP)

(73) Assignee: DWANGO Co., Ltd. (JP)

( * ) Notice: Subject to any disclaimer, the term of this patent is extended or adjusted under 35 U.S.C. 154(b) by 0 days.

(21) Appl. No.: 18/012,631

(22) PCT Filed: Oct. 1, 2021

(86) PCT No.: PCT/JP2021/036473
§ 371 (c)(1),
(2) Date: Dec. 22, 2022

(87) PCT Pub. No.: WO2022/091694
PCT Pub. Date: May 5, 2022

(65) Prior Publication Data
US 2023/0254524 A1 Aug. 10, 2023

(30) Foreign Application Priority Data
Oct. 26, 2020 (JP) .................................. 2020-179151

(51) Int. Cl.
*H04N 21/266* (2011.01)
*H04N 21/2187* (2011.01)
(Continued)

(52) U.S. Cl.
CPC ....... *H04N 21/266* (2013.01); *H04N 21/2187* (2013.01); *H04N 21/235* (2013.01); *H04N 21/238* (2013.01)

(58) Field of Classification Search
CPC ............. H04N 21/266; H04N 21/2187; H04N 21/235; H04N 21/238; H04N 21/4312;
(Continued)

(56) References Cited

U.S. PATENT DOCUMENTS

2008/0249873 A1* 10/2008 Seelinger ............... G06Q 30/02
705/14.69
2015/0287403 A1* 10/2015 Holzer Zaslansky .......................
G06T 13/205
704/231
(Continued)

FOREIGN PATENT DOCUMENTS

| CN | 107209731 A | 9/2017 |
| JP | 6511217 B1 | 5/2019 |
| JP | 2020017244 A | 1/2020 |

OTHER PUBLICATIONS

17Live Sep. 4, 2018, Internet: <URL:https://jp.17.livenews/1166/>, pp. 1, 2, non-official translation.
(Continued)

*Primary Examiner* — Adil Ocak
(74) *Attorney, Agent, or Firm* — Bracewell LLP; Doug F. Stewart; Patrick J. Connolly

(57) ABSTRACT

A video distributing device configured to provide a service readily enabling bidirectional communication between distributors that distribute live broadcast video content and viewers thereof and enliven the video content including:
a first acquiring part that acquires real time video data supplied from a terminal;
a second acquiring part that acquires input information containing communication image information selected terminal operations; and
(Continued)

a distributing part that distributes video data for distribution containing communication image data and real time video data to viewer terminals and a distributor terminal.

14 Claims, 11 Drawing Sheets

(51) Int. Cl.
*H04N 21/235* (2011.01)
*H04N 21/238* (2011.01)

(58) Field of Classification Search
CPC ........... H04N 21/4784; H04N 21/4788; H04N 21/8146; G06F 3/0481; G06F 3/0488; G06F 13/00; H04L 65/40
See application file for complete search history.

(56) References Cited

U.S. PATENT DOCUMENTS

| 2016/0277802 | A1* | 9/2016 | Bernstein | ......... H04N 21/44213 |
| 2017/0260702 | A1 | 9/2017 | Graham | |
| 2019/0260702 | A1* | 8/2019 | Hall | ......................... H04L 67/75 |

OTHER PUBLICATIONS

17Live News, Apr. 18, 2020, Internet: <URL:https://sa9da.com/17live-how-to-kaisetsu-15187/>, pp. 1-18, Ichinana, How to Use 17Live retrieved on Jun. 21, 2021.
PCT/JP2021/036473 International Search Report dated Dec. 14, 2021, 3 pgs.
CN202180023317.5 Office Action dated Jul. 8, 2024, 14 pages.

* cited by examiner

EMA

VIDEO DISTRIBUTING DEVICE, VIDEO DISTRIBUTING METHOD, AND RECORDING MEDIA

TECHNICAL FIELD

The present invention is related to a video distributing device, a video distribution method, and recording media.

BACKGROUND ART

In recent years, it has become possible for viewers to select from among a large amount of video content in a prepared environment in which individuals can easily distribute video content. When a distributor distributes video content in real time (live broadcast), for example, a viewer can post a comment and this enables communication between themselves and the distributor, the distributor to respond according to reactions of the viewer, and a realistic viewer experience unique to live broadcasts.

Patent Document 1 proposes technology enabling communication between the distributor and the viewer by means other than comments. For example, Patent Document 1 proposes technology enabling the viewer to introduce an object (virtual item) into a virtual space. For example, Patent Document 1 describes that the server includes a distributing part that distributes virtual space data with objects that are operated by the distributor terminal present to the viewer terminal and the distributor terminal and a receiving part that receives introduction input of a virtual item introduced to the virtual space from the distributor terminal and/or the viewer terminal, that the distributing part distributes virtual item data controlled by a virtual item controller combined with the virtual space data, and that regarding calculations for the case where the virtual items introduced have an external text shape, "text itself falling from above is interesting". (For example, paragraph [0110] of Patent Document 1).

In addition, Patent Document 1 describes "there may be an upper limit on the number of virtual items that can be introduced to a single program being broadcast. Also, even if the upper limit of virtual items has been introduced, virtual item introduction feasibility can be refilled based on passage of time or specific conditions being satisfied". (For example, paragraph [0094] of Patent Document 1).

There is also the description that "the user management part 2g records the history of virtual items introduced to virtual space being used by each live content and the type of item. (For example, paragraph [0029] of Patent Document 1).

In addition, there is also the description that as an example of virtual item control, introduction of virtual items can be prohibited. (For example, paragraph [0095] of Patent Document 1).

RELATED ART DOCUMENTS

Patent Documents

Patent Document 1: Japanese Unexamined Patent Application 2020-17244

SUMMARY OF THE INVENTION

Problem to be Solved by the Invention

For example, an "emote" service is being considered as a means of communication between viewers and distributors. Emotes are, for example, a means for simplifying communication between the viewer and the distributor by introducing images that express emotions or ideas of the viewer using text or color onto the content display screen. For example, while watching video content, the viewer can communicate with the distributor by selecting emote images that express the thoughts and emotions of the viewer from a plurality of emote images presented on the periphery of the content display screen and introducing the emote images into the content display screen.

On the other hand, this requires the distributor to communicate with a large number of viewers and thus communication means enabling the distributor to effectively convey emotions and ideas to a large number of viewers is desirable.

In light of the circumstances described above, an object of the present invention is to provide a video distributing device, a video distributing method, and recording media that provides a service that facilitates bidirectional communication between the distributor that distributes live broadcast video content and the viewer and enlivens the video content.

Means to Solve the Problem

A video distributing device of a first aspect according to the present invention, including:
 a first acquiring part that acquires real time video data supplied from a distributor terminal;
 a second acquiring part that acquires input information containing communication image information selected by means of distributor terminal operations; and
 a distributing part that distributes video data for distribution containing communication image data and real time video data to the viewer terminal and the distributor terminal.

The video distributing device according to a second aspect of the present invention with respect to the video distributing device according to the first aspect, further includes:
 a third acquiring part that acquires input information containing a second communication image selected by means of viewer terminal operations; and
 a generating part that generates motion information for displaying mutual interactions of the communication image and the second communication image based on performing prescribed motions on the display screen according to the laws of physics; wherein
 the video data for distribution includes the second communication image data and the motion information.

The video distributing device according to a third aspect of the present invention with respect to the video distributing device according to the first aspect, further includes:
 a generating part including a charge amount management part that allocates a charge amount to each distributor that operates the distributor terminal for each real time video data distributed to viewer terminals and when the charge amount consumed for displaying a communication image is less than the current charge amount allocated to the distributor, consumes the charge amount allocated to the distributor, and generates display information for displaying the communication image; wherein
 the video data for distribution further includes the display information.

The video distributing device according to a fourth aspect of the present invention with respect to the video distributing device according to the third aspect, where:

the input information includes the time length that the
distributor terminal was operated or the pressure on the
screen when the distributor terminal was operated and
identification information of the selected communication image;

the charge amount management part consumes a number value according to the time length or pressure information from the charge amount and generates display information containing the time length or pressure information; and the generating part changes the motion or size of the communication image according to the time length or pressure.

The video distributing device according to a fifth aspect of the present invention with respect to the video distributing device according to the first aspect, where:

the input information includes identification information of the communication image selected; and the video data for distribution includes motion information to enable the communication image to move corresponding to the identification information upon being displayed on the viewer terminal.

The video distributing device according a sixth aspect of the present invention with respect to the video distributing device according to the third aspect, where the charge amount management part manages the communication image post history during the time from start to end of distributing the video data in real time based on the input information.

A video distributing method according to a seventh aspect of the present invention, includes:

a first acquiring step of acquiring real time video data supplied from a distributor terminal;

a second acquiring step of acquiring input information containing communication image information selected by means of distributor terminal operations; and a distributing step of distributing video data for distribution containing communication image data and real time video data to the viewer terminal and the distributor terminal.

A recording media according to an eighth aspect of the present invention that is readable by a computer having a video distribution program recorded for executing:

a first acquiring function for acquiring real time video data supplied from a distributor terminal;

a second acquiring function for acquiring input information containing communication image information selected by means of operating the distributor terminal;

a generating function for generating video data for distribution using data for the communication image performing a prescribed motion on the display screen and real time video data; and a distributing function for distributing video data for distribution containing video data for distribution that uses the communication image data and the real time video data to viewer terminals and distributor terminals in a computer.

Effect of the Invention

The present invention is able to provide a video distributing device, a video distributing method, and recording media that provides a service that facilitates bidirectional communication between the distributor that distributes live broadcast video content and the viewer and enlivens the video content.

EMBODIMENTS OF THE INVENTION

A video content distributing system, video distribution method, and recording media according to the first embodiment are described below with reference to the drawings.

Figure 1:
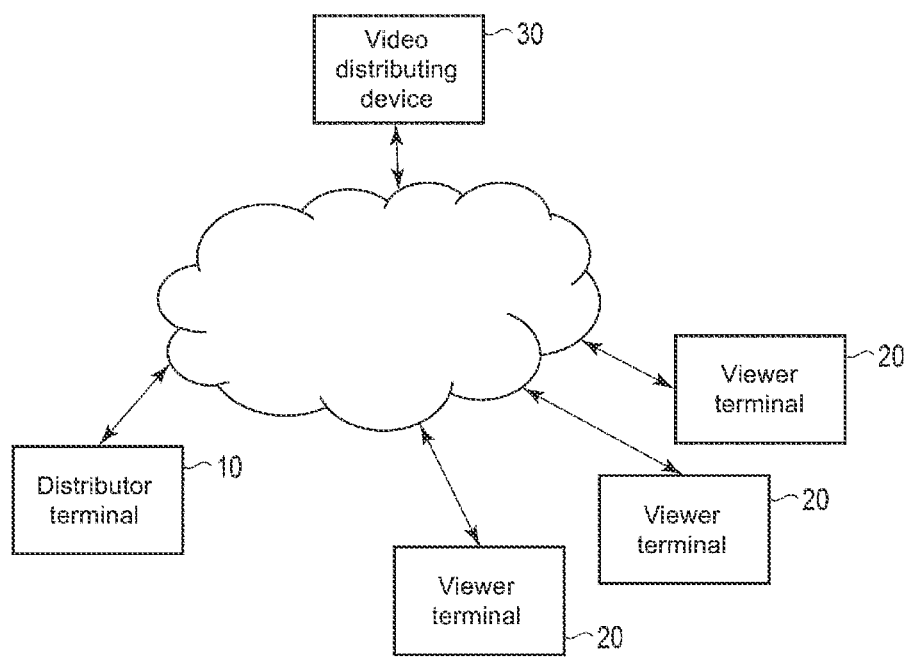
FIG. 1 is a diagram illustrating a schematic configuration of a video content distributing system including the video distributing device according to the Embodiment.

FIG. 1 is a diagram illustrating a schematic configuration of a video content distributing system including the video distributing device according to the Embodiment.

The video distribution system is provided with a distributor terminal 10 and a video distributing device 30. The video distributing device 30 can be communicably connected to the distributor terminal 10 and a viewer terminal 20 via a network. Note that three of the viewer terminals 20 are displayed in FIG. 1, however, the number of the viewer terminals 20 is not limited to the number illustrated, and may even be zero.

The distributor terminal 10 may be an electronic device such as a computer that can be connected to a video source such as, for example, a video camera; examples include: a television receiver (including internet television), PC (Personal Computer), mobile terminal (for example, tablet, smartphone, laptop, feature phone, portable gaming equipment, digital music player, e-book reader, and the like), VR (virtual reality) terminal, AR (augmented reality) terminal, and the like, but the terminal is not limited thereto. The distributor terminal 10 includes at least one processor and a storing part that stores programs executed by the processor and is configured to enable implementation of various functions via software or a combination of software and hardware.

The distributor terminal 10 sends content data such as video data for real time distribution to the video distributing device 30. The content data may include identification information of the distributor (broadcaster) or the distributor terminal 10.

The viewer terminal 20 may be an electronic device such as a computer, for example, a television receiver (including internet television), PC (Personal Computer), mobile terminal (for example, tablet, smartphone, laptop, feature phone, portable gaming equipment, digital music player, e-book reader, and the like), VR (virtual reality) terminal, AR (augmented reality) terminal, and the like, but the terminal is not limited thereto.

The viewer terminal 20 includes at least one processor and memory on which a program executed by the processor is recorded and is configured to enable implementation of various functions via software or a combination of software and hardware.

The viewer terminal 20 is capable of receiving content data such as video data or real time video list data from the video distributing device 30 and presenting content to the viewer by display means, audio means, or the like (not shown).

Figure 2:
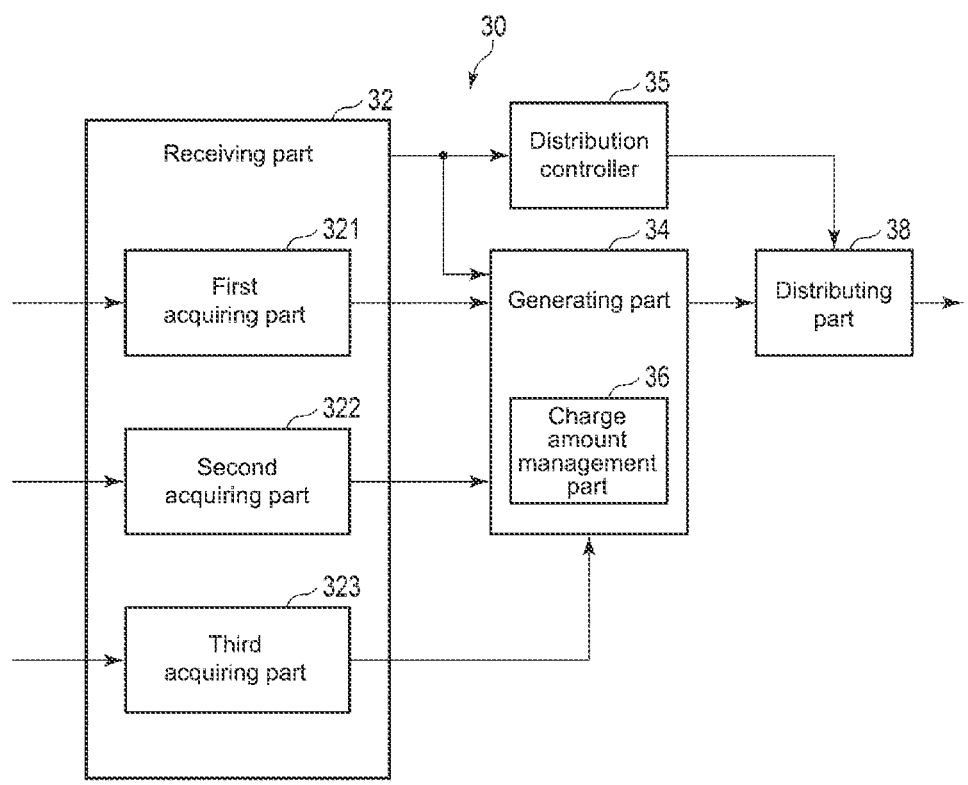
FIG. 2 is a block diagram schematically illustrating a configuration example of the video distributing device according to an Embodiment.

FIG. 2 is a block diagram schematically illustrating a configuration example of the video distributing device according to Embodiment 1. The video distributing device 30 includes a generating part 34, a distributing part 38, a distribution controller 35, and a receiving part 32 containing a first acquiring part 321, a second acquiring part 322, and a third acquiring part 323.

The video distributing device 30 can be provided with a processor to execute a program for achieving the configured functions described above and memory for storing the program. The processor is typically a CPU (Central Processing Unit) and/or a GPU (Graphics Processing Unit) but may be a microcontroller, FPGA (Field Programmable Gate Array), a DSP (Digital Signal Processor), or the like. In addition, the memory temporarily stores the program executed by the processor, data used by this processor, and the like, for implementing operation of the video distributing device.

Furthermore, the video distributing device 30 may be further provided with a communicating part that can connect to the network and a data storing part (not shown) for compiling a large amount of data. The data storing part may be built into the video distribution device 30 or attached externally to the video distributing device 30. The data storing part may include non-volatile storing media such as, for example, a HDD (Hard Disk Drive), SSD (Solid State Drive), or the like.

The receiving part 32 is capable of communicating with the distributor terminal 10 and the viewer terminal 20 through the network, and may contain the first acquiring part 321, the second acquiring part 322, and the third acquiring part 323. For example, the receiving part 32 receives video data from the distributor terminal 10 and receives distribution requests from the viewer terminal 20. The receiving part 32 transmits a distribution request received from the viewer terminal 20 to the distribution controller 35 and the generating part 34. The distribution request from the viewer terminal 20 may include identification information of the viewer or the viewer terminal 20 and identification information of video content.

The first acquiring part 321 can receive real time video data sent sequentially from the distributor terminal 10 via the network. Specifically, the first acquiring part 321 receives video data for real time distribution from the distributor terminal 10. The first acquiring part 321 sends the received video data to the generating part 34.

The second acquiring part 322 acquires input information supplied from the distributor terminal 10. The information input from the distributor terminal 10 may include:

information requesting deletion of all emote images EM posted to the video content from the viewer terminal 20 while performing a live broadcast;

information requesting prohibiting the posting of emote images EM;

information requesting adjustment of the transparency of the posted emote images EM;

information requesting adjustment to the amount of time posted emote images EM remain on the display screen of the viewer terminal 20;

information requesting posting of emote images EM that perform a prescribed action and broadcaster emote images EMA on the display screen of the viewer terminal 20; and information requesting thinning out of the emote images EM posted from the viewer terminal 20. The second acquiring part 322 supplies the information input through the distributor terminal 10 to the generating part 34.

The third acquiring part 323 can receive information corresponding to video content input through the viewer terminal 20. Specifically, input information received by the third acquiring part 323 through the viewer terminal 20 may include identification information for video content being viewed, information (identification information and the like) related to a comment input by a viewer or an emote image (second communication image) EM posted on a content display screen, operation information (length of operation time, pressure during operation, and the like) of the viewer terminal 20 by the viewer, or the like. The third acquiring part 323 sends the received input information to the generating part 34.

Note that the broadcaster emote image EMA is an image for expressing a feeling or intention of the distributor by means of text, color, or the like which is posted on the content display screen based on an operation by the distributor, being means for easy communication between the viewer and the distributor. The broadcaster's emote image EMA cannot be selected at the viewer terminal 20, and can be selected only at the distributor terminal 10.

In addition, the emote image EM is a communication image shared between the viewer and the distributor, an image for expressing emotes or ideas of the viewer or distributor using text or colors, is posted to the content display screen based on an operation by the viewer or distributor, and is means for facilitating communication between the viewer and the distributor.

The distribution controller 35 controls real time distribution operations of the video data. The distribution controller 35 can receive distribution requests of the viewer terminal 20 from the receiving part 32 and controls the distributing part 38 such that image data is distributed to the viewer terminal 20. Furthermore, the distribution controller 35 includes, for example, a clock (not shown), and may compare time information obtained from the clock with a time frame assigned to a real time distribution of the image data and manage a start and end of real time distribution of the image data. Moreover, the distribution controller 35 may manage starting and ending real time distribution by starting distribution of video content in real time based on receiving of video data for distribution and ending distribution of video content based on video data for distribution stopping.

The generating part 34 includes a charge amount management part 36. The charge amount management part 36 receives a distribution request of the viewer terminal 20 from the receiving part 32 and receives input information of the viewer terminal 20 from the third acquiring part 323. In addition, the charge amount management part 36 can receive input information or content data of the distributor terminal 10 from the second acquiring part 322.

The charge amount management part 36 identifies the distributor or distributor terminal 10 based on identification information included in the content data received from the distributor terminal 10 (or based on login information of the distributor terminal 10) and allocates a charge amount to the distributor (or distributor terminal 10) for the distributed video content. In addition, the charge amount management part 36 identifies the viewer or viewer terminal 20 based on the obtained distribution request and allocates a charge amount for the respective video content being distributed in real time per viewer (or viewer terminal 20).

Note that the charge amount management part 36 can manage the charge amount using distributor and viewer identification information registered beforehand (such as username and password or membership level) when managing the charge amount for each distributor or managing the charge amount for each viewer. Note, the distributor and viewer identification information may be stored in the storing part of the video distributing device 30 or may be managed by a server external to the video distributing device 30.

The maximum charge amount allocated to each distributor and each viewer may differ based on the membership level of the distributor and the viewer. For example, the charge amount management part 36 can manage charge amounts so that the maximum charge amount for a premium member, which is a higher level than a general member, is higher than that for a general member. In addition, the maximum value of a charge amount imparted to a distributor may differ from the maximum value of a charge amount imparted to a viewer.

The charge amount management part 36 manages charge amounts consumed through emote images EM and broadcaster emote images EMA posted from the distributor terminal 10 based on content data and input information from the distributor terminal 10. Regarding the video content distributed by the distributor, the charge amount management part 36 consumes the charge amount corresponding to posted emote images EM and broadcaster emote images EMA from the charge amount allocated to the distributor.

In addition, based on the distribution request and input information from the viewer terminal 20, the charge amount management part 36 manages the charge amount based on the emote images EM posted from the viewer terminal 20. For example, for each video content viewed by a viewer, the charge amount management part 36 consumes the charge amount corresponding to posted emote images EM from the charge amount allocated to each viewer.

Note that the charge amount consumed may be the same or different for emote images EM and broadcaster emote images EMA posted to video content. If the charge amounts consumed respectively by emote images EM and broadcaster emote images EMA are different, for example, identification information for emote images EM and broadcaster emote images EMA is associated with the charge amounts consumed and this is stored in the storing part.

In addition, for the charge amount to recover from zero to the maximum value over a prescribed amount of time, the charge amount management part 36 increases the charge amount according to the passage of time. Note that in another aspect for charge amount recovery, the charge amount management part EM [sic] is not required to recover the charge amount from zero to the maximum value and, for example, upon recovery to a value lower than the maximum value, may temporarily stop recovery. In addition, even during charge amount recovery, as long as the charge amount exceeds the amount consumed for emote images EM (or broadcaster emote images EMA), the viewer and distributor can post emote images EM (or broadcaster emote images EMA) to the video content.

For each content being distributed in real time and if the current charge amount value allocated to each viewer is at a value corresponding to the selected emote images EM or higher, the charge amount management part 36 consumes charge amount allocated to each viewer and generates display information displaying the emote images EM. In addition, for each content being distributed by the distributor and if the current charge amount allocated to the distributor is at a value corresponding to the selected emote images EM or broadcaster emote images EMA, the charge amount management part 36 consumes the charge amount allocated to the distributor and generates display information displaying the emote images EMA [sic].

For each content being distributed in real time and if the current charge amount allocated to each viewer is less than the value corresponding to the emote image EM the viewer is attempting to post, the charge amount management part 36, for example, generates display information indicating that the charge amount is insufficient on the viewer terminal 20. In addition, for each video content the distributor is distributing and if the current charge amount imparted to the distributor is less than the value corresponding to the emote image EM or broadcaster emote image EMA the distributor is attempting to post, the charge amount management part 36, for example, generates display information indicating the charge amount is insufficient on the distributor terminal 10.

In addition, based on the information input from the distributor terminal 10 and the viewer terminal 20, the charge amount management part 36 can manage the post history of emote images EM and broadcaster emote images EMA for each of the video content being distributed during the period from start to end of distribution. For example, for each of the content being distributed, the charge amount management part 36 can count the number of times posted for each emote image EM and each broadcaster emote image EMA and can generate display information displaying a graph indicating the number of posts starting with the highest number of posts and display indicators corresponding to the emote images EM and the broadcaster emote images EMA close to the graph. History management of emote images EM and broadcaster emote images EMA posted on video content will be described below with reference to the drawings.

The generating part 34 receives real time video data from the first acquiring part 321, receives information input by the distributor from the second acquiring part 322, and receives information input by the viewer from the third acquiring part 323.

The generating part 34 can, for example, generate video data for distribution with comments and emote images EM based on input information input from the viewer terminal 20 and broadcaster emote images EMA input from the distributor terminal 10 superimposed on the real time video data. The generating part 34 can combine comments, emote images EM and broadcaster emote images EMA with real time video data using a well-known technique such as, for example, alpha blending or picture-in-picture. In addition, to enable combining comments, emote images EM, and broadcaster emote images EMA with real time video data on the viewer terminal 20, the generating part 34 can generate video data for distribution containing this information.

Upon receiving information requesting deletion of all the emote images EM from the distributor terminal 10 as input information, the generating part 34, for example, can generate video image data for distribution such as the emote images EM posted to the corresponding video content being blown away by wind or being blown out of the display screen by the exploding of a bomb.

In addition, the generating part 34 can generate motion information displaying the broadcaster emote images EMA avoiding emote images EM posted from viewer terminals 20 or control operation of broadcaster emote images EMA, in other words, generate motion information displaying broadcaster emote images EMA avoiding emote images EM posted from viewer terminals 20 according to an instruction signal from the distributor terminal 10. Motion information of the emote images EM and the broadcaster emote images EMA will be described below.

In addition, upon receiving information requesting prohibiting introduction of emote images EM as input information from the distributor terminal 10, for example, an image or text indicating introducing emote images EM is prohibited is displayed on at least a part of the video content so as to enable recognition by the viewer or temporarily displaying an image or text indicating introduction is prohibited if the viewer performs an operation attempting to introduce an emote image EM. Alternatively, image data for distribution can be generated where selection of emote images EM in a second area 110 (or fourth area 210) by the viewer is disabled (non-active state).

In addition, upon receiving information requesting adjustment to the transparency of the emote image introduced as input information from the distributor terminal 10, the generating part 34 can, for example, adjust and display the emote image EM at the requested level of transparency when displayed on the display screen of the viewer terminal 20.

In addition, upon receiving information requesting adjustment to the residing time on the display screen of the viewer terminal 20 of the introduced emote image as input information from the distributor terminal 10, the generating part 34 can, for example, adjust the residing time of the emote image EM on the display screen of the viewer terminal 20 as requested enabling residing on the display screen a shorter or longer period of time.

In addition, upon receiving information requesting thinning out of emote images EM introduced as input information from the distributor terminal 10, the generating part 34 can generate image data for distribution with a number of emote images EM introduced to the video content thinned at random or generate image data for distribution with the time until the introduced emote images EM that are displayed on the viewer terminal 20 disappear shortened.

The generating part 34 may, for example, resize a portion or all of a playback video screen for real time video data or trim a portion of the screen and combine the portion with input information, or may combine the portion with evaluation information such that the portion of the playback video screen for the real time video data is exposed and the rest is hidden. In addition, the generating part 34 can exchange and distribute a plurality of video data for distribution in response to a distribution request from the viewer terminal, and therefore may generate and distribute a plurality of video data for distribution having a different display image to the distributing part 38.

In addition, when the emote images EM and broadcaster emote images EMA are displayed on the viewer terminal 20 and distributor terminal 10, the generating part 34 can generate motion information where the image performs a prescribed motion on the display screen according to the type of emote image EM or broadcaster emote image EMA (for example, can be classified using identification information), as described below, based on display information generated by the charge amount management part 36. The generating part 34 can send video data for distribution containing motion information to the distributing part 38.

Note, the distributed video data, data for displaying comments, emote images EM, and broadcaster emote images EMA can be combined and displayed on the viewer terminal 20 and distributor terminal 10 using motion information. The real time video data included in the video data for distribution, data for displaying comments, and emote images EM and broadcaster emote images EMA can be combined beforehand in the generating part 34 and then distributed to the viewer terminal by the distributing part 38.

In addition, the generating part 34 can arrange (or assume that an object is arranged) transparent obstacles on the display screen that are not viewed by the viewer or distributor to guide emote images EM and broadcaster emote images EMA to the outer peripheral areas of the screen to prevent hindering viewing of the video content.

In addition, the generating part 34 can control the transparency of the emote images EM and the broadcaster emote images EMA introduced by the broadcaster, in other words, by introducing emote images EM and broadcaster emote images EMA that are not opaque onto the display screen based on instructions of the distributor (broadcaster), viewing of content images behind the emote images EM and broadcaster emote images EMA by the viewer is feasible. Alternatively, transparent obstacles can be arranged on the display screen that are not viewed by the viewer or distributor to guide emote images EM (or emote images EM and broadcaster emote images EMA) to the outer peripheral areas of the screen to prevent hindering viewing of the video content. In this case, introducing of an actual transparent, in other words invisible, broadcaster emote EMA [sic] onto the display screen guides emote images EM (or emote images EM and other broadcaster emote images EMA) to the periphery of the screen and similar to the case of assuming a transparent broadcaster emote EMA [sic] has been introduced, display control for each of the objects on the display screen can be performed by calculating motion such as physical action including collisions for the emote images EM (or emote images EM and other broadcaster emote images EMA) on the periphery of the screen. With this manner of control, a viewer who is used to visible broadcaster emote images EMA that are not transparent feels as if there is an object like a transparent image (emote image EM or broadcaster emote image EMA) on the screen and this has the effect of raising interest.

The distributing part 38 is connected enabling communication with the network, receives video data for distribution from the generating part 34, and distributes the video data to the viewer terminal 20 from which the distribution request was received. The distribution destination of the video data for distribution, for example, for the distributing part 38 is controlled by the distribution controller 35. Note that based on control by the distribution controller 35, the distributing part 38 can distribute the video data for distribution to the distributor terminal 10 that distributes video content.

The distributing part 38 may immediately discard the video data for distribution that has been distributed but may perform buffering for a prescribed period to enable replay or slow motion playback.

A specific example of a video distributing device 30 operation will be described below with reference to an example of a video content display screen on the viewer terminal 20.

Figure 3:
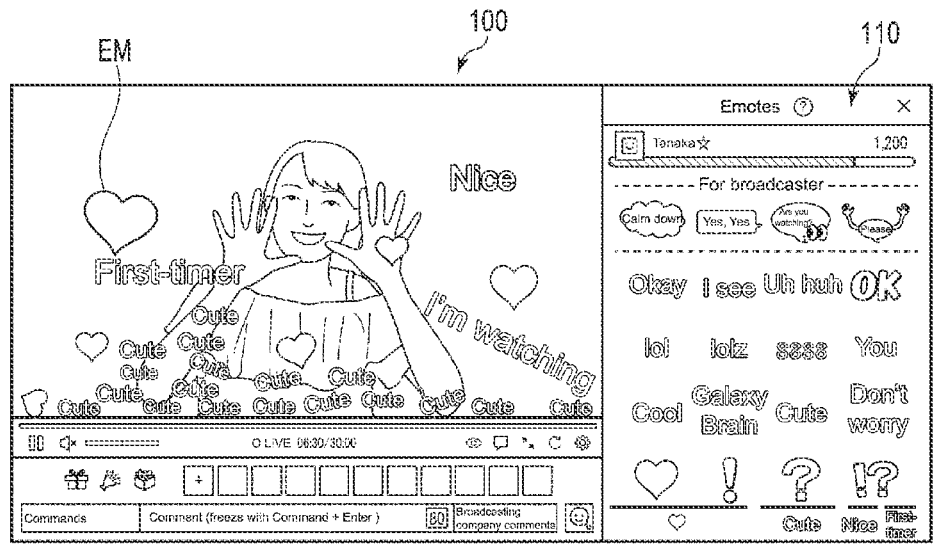
FIG. 3 is a diagram schematically illustrating a display example of a content viewer terminal distributed to in real time.

FIG. 3 is a diagram schematically illustrating a display example of a content viewer terminal distributed to in real time. This illustrates an example of content display when the viewer terminal 20 is a personal computer.

In the display example of FIG. 3, a first area 100 containing a part where video content is displayed and a second area 110 where a list of emote images EM and broadcaster emote images EMA are presented to the viewer are displayed side by side on the computer screen.

The first area 100 includes a part where the video content is displayed, a part where operation buttons and a time bar are displayed, and an input field where the viewer inputs comments.

Various emote images EM are introduced on the video content. Here, an example in which a plurality of types of emote images EM are input is illustrated. This manner of emote image EM performs actions that emphasize emotes or ideas of the viewer expressed through emote images EM such as, for example, an action of falling from the upper part of the screen to the lower part of the screen, an action of growing up from the bottom of the screen, an action of being thrown into the screen, an action of rolling in from one of either the left or right along the bottom of the screen, an action of the image blinking, an action of the image bursting or exploding, an action of bouncing like an elastic body, or the like.

Although not illustrated in FIG. 3, broadcaster emote images EMA also perform actions emphasizing the emotes or ideas of the distributor on the display screen in a similar manner. An operating example of a broadcaster emote image EMA is described below.

The actions of emote images EM and broadcaster emote images EMA in the generating part 34 of the video distributing device 30, for example, can be actions obtained from laws of classical mechanics (mass, speed, friction, wind) or actions from physical calculations based on the laws of physics such as collisions, fluids, or the like. For example, the generating part 34 can calculate actions of the emote images EM and the broadcaster emote images EMA based on the laws of physics using the mass, weight, elastic modulus, surface coefficient of friction, hardness, and the like set for the respective emote images EM and broadcaster emote images EMA.

By performing the emote images EM and broadcaster emote images EMA actions calculated based on the laws of physics, the generating part 34 can generate motion information where the emote images EM and broadcaster emote images EMA mutually interact on the display screens of the viewer terminal 20 and the distributor terminal 10. In other words, emote images EM together or emote images EM and broadcaster emote images EMA can operate individually based on the laws of physics or can mutually interact such as colliding or being blown away.

The actions of the emote images EM and broadcaster emote images EMA are not limited to that described above. For example, when the distance between communication images EM together or the distance between the communication images EM and the broadcaster communication images EMA becomes closer than a prescribed value (or when it is determined that they will come into contact after a prescribed period), one or both may take evasive action, sending something like wind (may be something unreal like telekinesis) to another communication image EM or broadcaster communication image EMA to blow away the communication image EM or broadcaster communication image EMA and move or bend the direction of travel.

Motion information of the emote images EM and broadcaster emote images EMA may be included in the video data for distribution, for example, and distributed to the viewer terminal 20 and distributor terminal 10. In this case, the viewer terminal 20 and distributor terminal 10 can cause the emote images EM and broadcaster emote images EMA to move on the display screen according to the received motion information.

The video distributing device 30 may distribute data for the emote images EM and broadcaster emote images EMA moving according to the motion information and video data for distribution including real time video data to the viewer terminal 20 and the distributor terminal 10. In addition, the video distributing device 30 may distribute video data for distribution with data of the emote images EM and broadcaster emote images EMA moving according to the motion information already combined with video data to the viewer terminal 20 and the distributor terminal 10.

In addition, depending on the type of emote images EM and broadcaster emote images EMA, the motion information of the emote images and broadcaster emote images EMA may be calculated at each of the viewer terminals 20 and the distributor terminal 10.

For example, the generating part 34 can send video data for distribution to the distributing part 38, including communication images EM and broadcaster emote images EMA motion information (for example, may at least include current position, travel direction, speed, rotation, rotation speed, and shape of the communication image or a portion thereof) and, based on the laws of physics, motion information and calculation commands for generating calculation commands for motion of other communication images EM, EMA (if present). The viewer terminal 20 displays the communication images EM and broadcaster communication images EMA that move with mutual interactions based on the laws of physics and based on the motion information and calculation commands included in the video data for distribution distributed by the video distributing device 30.

In addition, the video data for distribution may include communication image EM and broadcaster communication image EMA data itself or may include identification information (for example, number or name) of the communication images EM and broadcaster communication images EMA. In the case that the communication image EM and broadcaster communication image EMA identification information is included in the video data for distribution, the viewer terminal 20 and distributor terminal 10 have identification information associated with the communication image EM and broadcaster communication image EMA data and so can synthesize the content causing the images associated with the identification information obtained to perform the prescribed actions.

The generating part 34 can generate video data for distribution such that, after the emote image EM remains on the screen for a prescribed period of time, the emote image EM and broadcaster emote image EMA are guided to an outer portion of a display region and gradually disappear, or the like. The generating part 34 may regulate a prescribed time until the emote images EM and broadcaster emote images EMA are no longer displayed based on a number of emote images EM and broadcaster emote images EMA introduced to the content video per unit time or time can be set in advance for each type of emote images EMA [sic] and broadcaster emote images EMA.

In addition, if the number of emote images EM introduced to the video content per unit time exceeds a prescribed threshold, the generating part 34 can thin out the emote images for display. As described above, adjusting the period of time during which the emote image EM is displayed, or the number displayed can eliminate viewers being prevented from viewing video content. The generating part 34 can suppress the number of emote images EM introduced per a set number of seconds as well as the number of emote images EM remaining on the display screen of the viewer terminal 20. In addition, the generating part 34 can generate motion information to arrange transparent obstacles (or assume that a transparent object is arranged) on the display screen that are not viewed by the viewer or distributor to guide emote images EM and broadcaster emote images EMA to the outer peripheral areas of the screen to prevent hindering viewing of the video content. For example, the generating part 34 can arrange a transparent object on the screen as an obstacle (or assume an obstacle is arranged) for the emote images EM and broadcaster emote images EMA and can slope the bottom portion onto which the emote images EM and broadcaster emote images EMA fall with respect to horizontal. Thus, motion information for the emote images EM and broadcaster emote images EMA dropped onto the bottom portion from the upper portion of the screen can, for example, be generated as tumbling or sliding along a transparent object arranged at the bottom portion and guided off the screen.

In addition, for example, the generating part 34 may arrange a transparent object in the middle of the screen as an obstacle for the emote images EM and broadcaster emote images EMA. Thus, emote images EM and broadcaster emote images EMA that fall from the upper portion of the screen to the bottom portion, emote images EM and broadcaster emote images EMA thrown into the screen that cross over the center of the screen, and emote images EM and broadcaster emote images EMA that extend from the bottom portion of the screen upwards and reach the center of the screen are eliminated. Therefore, viewing of video content by the viewer is not hindered by the emote images EM and broadcaster emote images EMA.

Figure 4:
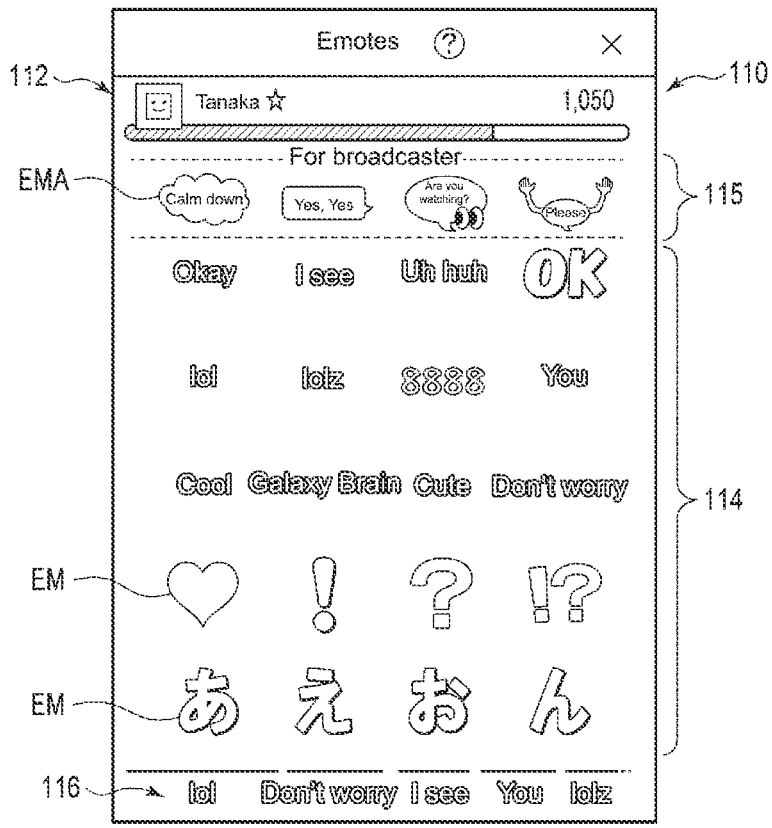
FIG. 4 is a diagram schematically illustrating a part of the display example of the content viewer terminal distributed to in real time.

FIG. 4 is a diagram schematically illustrating a part of the display example of the content viewer terminal distributed to in real time. Here, the second area 110 illustrated in FIG. 3 is schematically shown. The second area 110 includes a charge display area 112 for displaying the charge amount, an emote list display area 114 for displaying a list of emote images EM, a broadcaster emote list display area 115 for displaying a list of broadcaster emote images EMA, and a history display area 116 for displaying a history of the emote images EM that have been introduced.

A plurality of emote images EM are arranged side by side in the emote list display area 114. Viewers and distributors can perform a selection by clicking on an emote image EM in the emote list display area 114 to be introduced, for example. For example, the viewer terminal 20 and distributor terminal 10 can be provided with a sensor for detecting contact of the display screen by the distributor or the viewer and in this case, the viewer or the distributor can select an emote image EM in the emote list display area 114 to be introduced by contacting using a finger, touch pen, or the like. Identification information of the emote image EM selected by the viewer or distributor is sent to the video distributing device 30 as input information.

A plurality of broadcaster emote images EMA are arranged in a list in the broadcaster emote list display area 115. Distributors can perform a selection by clicking on a broadcaster emote image EMA in the broadcaster emote list display area 115 to be introduced, for example. For example, the distributor terminal 10 can be provided with a sensor for detecting contact by the distributor on the display screen and in this case, the distributor can select the broadcaster emote image EMA in the broadcaster emote list display area 115 to be introduced by contacting with a finger, touch pen, or the like. Identification information of the emote image EM selected by the distributor is sent to the video distributing device 30 as input information.

Figure 5:
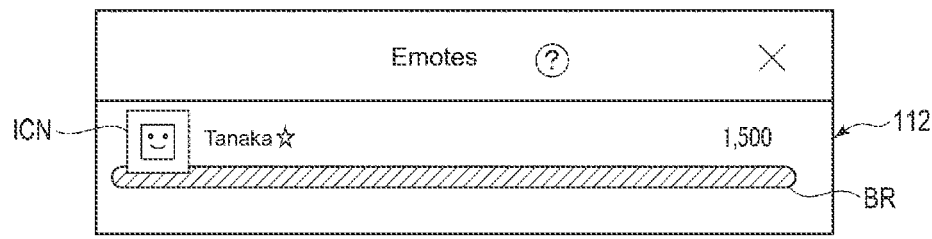
FIG. 5 is a diagram schematically illustrating a part of the display example of the content viewer terminal distributed to in real time.
Figure 6:
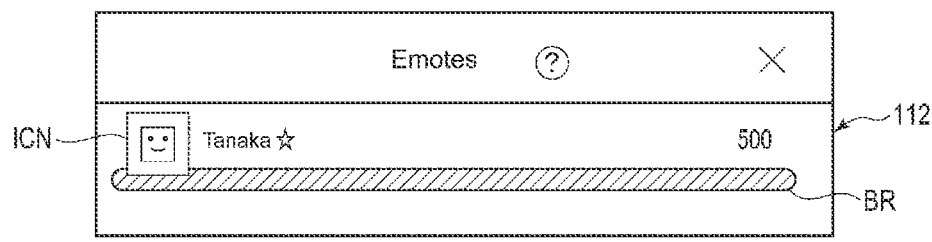
FIG. 6 is a diagram schematically illustrating a part of the display example of the content viewer terminal distributed to in real time.
Figure 7:
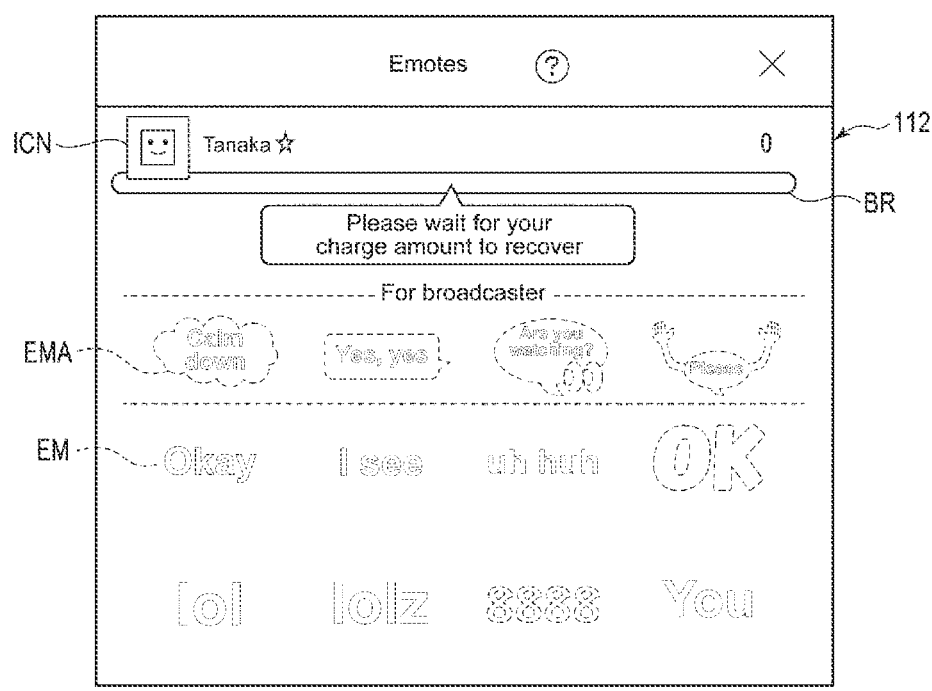
FIG. 7 is a diagram schematically illustrating a part of the display example of the content viewer terminal distributed to in real time.

FIG. 5 to FIG. 7 are diagrams schematically illustrating a part of the display example of the content viewer terminal distributed to in real time. FIG. 5 to FIG. 7 schematically illustrate a plurality of display examples of the charge display area 112 illustrated in FIG. 4.

The charge display area 112 is arranged above the emote list display area 114 (upper side in vertical direction on the display screen). An icon ICN set for each viewer, user name, and graph BR visually illustrating the charge amount are displayed in the charge display area 112.

The graph BR is a bar graph extending in the horizontal direction of the display screen on the viewer terminal. The length of the graph changes according to the charge amount and is at maximum length when the charge amount is at 100%. The charge amount is managed by the charge amount management part 36 for each distributor and viewer respectively with regards to the content that is distributed in real time. The charge amount consumption is set for each emote image EM and broadcaster emote image EMA. Using the allocated charge amount, a viewer can introduce an emote image EM to the video content. In addition, using the allocated charge amount, the distributor can introduce an emote image EM as well as a broadcaster emote image EMA to the video content.

For example, if a viewer with a charge amount of 500 introduces an emote image EM that consumes a charge amount of 100 to the content that the viewer is viewing, the remaining charge amount of the viewer reaches 400 and the length of the graph BR in the horizontal direction is shortened according to the charge amount consumed (100). For example, if a distributor with a charge amount of 1000 introduces a broadcaster emote image EMA that consumes a charge amount of 200 to the content being distributed, the remaining charge amount of the distributor reaches 800 and the length of the graph BR in the horizontal direction is shortened according to the charge amount consumed (200).

The maximum charge amount may be different based on the user level of the viewer and the distributor. For example, in the display example illustrated in FIG. 5, the user level of the viewer and distributor is high, and the maximum charge amount is 1,500. In the display example illustrated in FIG. 6, the user level of the viewer and distributor is low, and the maximum charge amount is 500.

FIG. 7 illustrates a display example of the charge display area 112 when the charge amount is zero. The charge amount is managed by the charge amount management part 36 to recover from 0% to 100% after a prescribed period of time has elapsed. When the charge amount is lower than a value enabling introducing an emote image EM or broadcaster emote image EMA, for example, the emote images EM and broadcaster emote images EMA may be displayed as not selectable (non-active display) and "please wait until your charge amount recovers" or the like may be displayed close to the graph BR.

Figure 8:
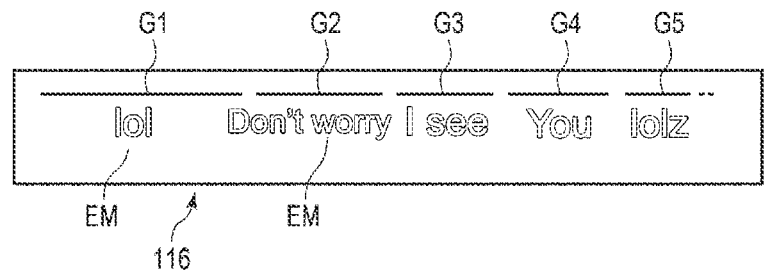
FIG. 8 is a diagram schematically illustrating a part of the display example of the content viewer terminal distributed to in real time.

FIG. 8 is a diagram schematically illustrating a part of the display example of the content viewer terminal distributed to in real time. This schematically illustrates a display example of the history display area 116 illustrated in FIG. 4. The history display area 116 is arranged at the bottom of the emote list display area 114 (lower side on the display screen in the vertical direction). Regarding video content being viewed by the viewer, a history of emote images EM introduced to date is arranged in order of number of times introduced in the history display area 116. Note that the history display may only display an introduction history of the number of times an emote image EM is introduced or may display an introduction history of combined number of times emote images EM have been introduced and number of times broadcaster emote images EMA have been introduced.

In the example illustrated in FIG. 8, graphs G1 to G5 corresponding to the number of introductions and emote images EM corresponding to each of the graphs G1 to G5 are displayed in the history display area 116. The graphs G1 to G5 are bar graphs extending in the horizontal direction on the display screen and the lengths of the graphs G1 to G5 in the horizontal direction are set according to the number of emote images EM introduced. The graphs G1 to G5 are arranged in the horizontal direction on the display screen.

In this example, the number of emote image EM introductions increases in order of "lol", "Don't worry", "I see", "Congrats", and "lolz". For example, the emote image with the most introductions, "Lol", is displayed close to the corresponding graph G1.

Figure 9:
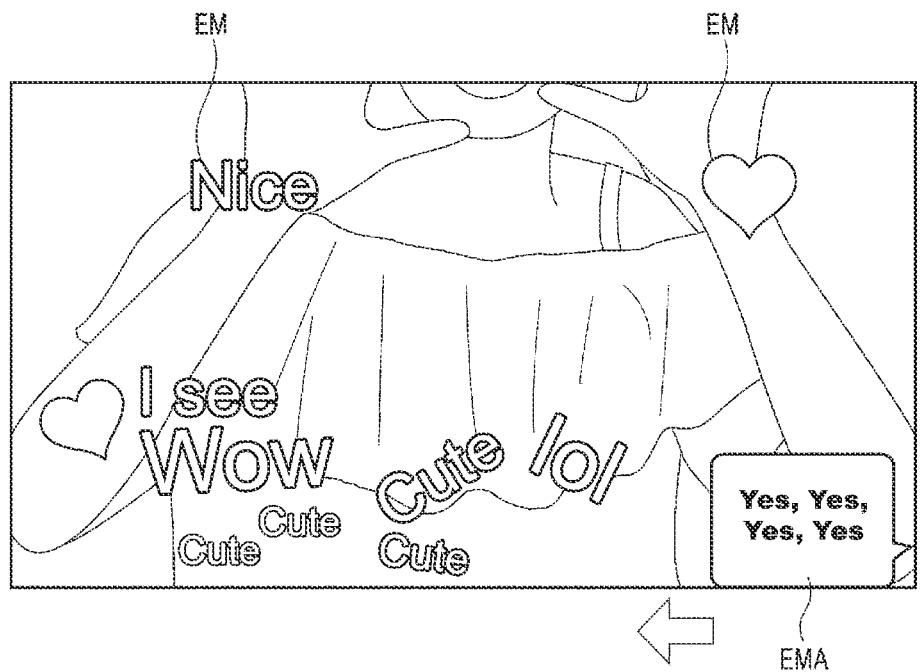
FIG. 9 schematically illustrates an example of an emote image displayed on a part of the display screen of the viewer terminal and a broadcaster emote image.

FIG. 9 schematically illustrates an example of an emote image displayed on a part of the display screen of the viewer terminal and an emote image for a broadcaster.
In this example, a part of the first area 100 is illustrated with emote images EM composed of text "Nice", "I see", "cute", "lol", "lolz", "good", and the like, emote images that are heart shaped, and a broadcaster emote image EMA with "yes, yes, yes, yes . . . " noted in a balloon graphic which are introduced to video content.

To express the emotes and ideas of the viewer and the distributor, these emote images EM and broadcaster emote images EMA have colors, shape, and motion set. For example, the emote image EM of the text "lol" can be set up with motion that mimics grass growing from the ground. For example, emote images EM that are heart shaped can be set to be introduced from the upper portion in the vertical direction of the display screen and fall downwards while lightly drifting on the screen. For example, as the emote image EM of the text "lolz" represents laughing by the viewer, this can be setup with the motion of bouncing or oscillating within the display screen.

For example, the broadcaster emote image EMA composed of the balloon graphic with the text "yes, yes, yes, yes . . . " noted therein can be set to move across the bottom of screen from one side to the other pushing the emote images EM that have piled up at the bottom of the display screen to the outside of the display screen.

The plurality of emote images EM and broadcaster emote images EMA, for example, can be set to move according to physics calculated in the generating part 34 and when the introduction motion is completed, can pile up at the bottom of the screen. Note that after staying on the screen for a prescribed period, the emote image is displayed as being guided off the screen or gradually disappearing so the screen will not become full of emote images EM and viewing of the video content will not be hindered.

Figure 10:
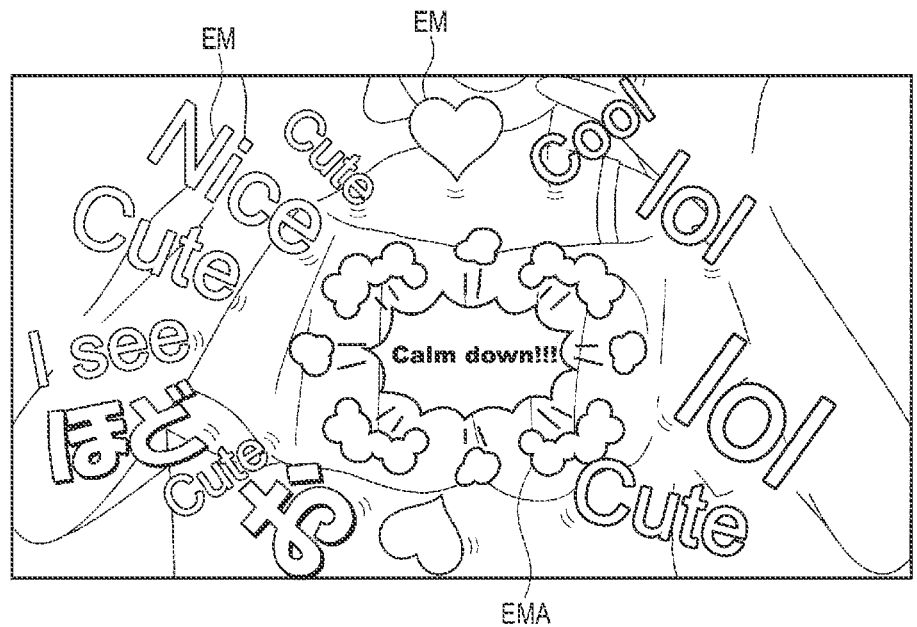
FIG. 10 schematically illustrates a display example of an emote image displayed on a part of the display screen of the viewer terminal and the broadcaster emote image.

FIG. 10 schematically illustrates an example of an emote image displayed on a part of the display screen of the viewer terminal and a broadcaster emote image.

In this example, a part of the first area 100 is illustrated with emote images EM composed of text "Nice", "I see", "cute", "lol", "lolz", "Good", and the like, emote images that are heart shaped, and a broadcaster emote image EMA with "calm down!!!" noted in a balloon graphic which are introduced to video content.

For example, the broadcaster emote image EMA that is a balloon graphic with the text "calm down!!!" noted can move in a manner of blowing a plurality of emote images EM introduced from viewer terminals 20 to outside the display screen.

Figure 11:
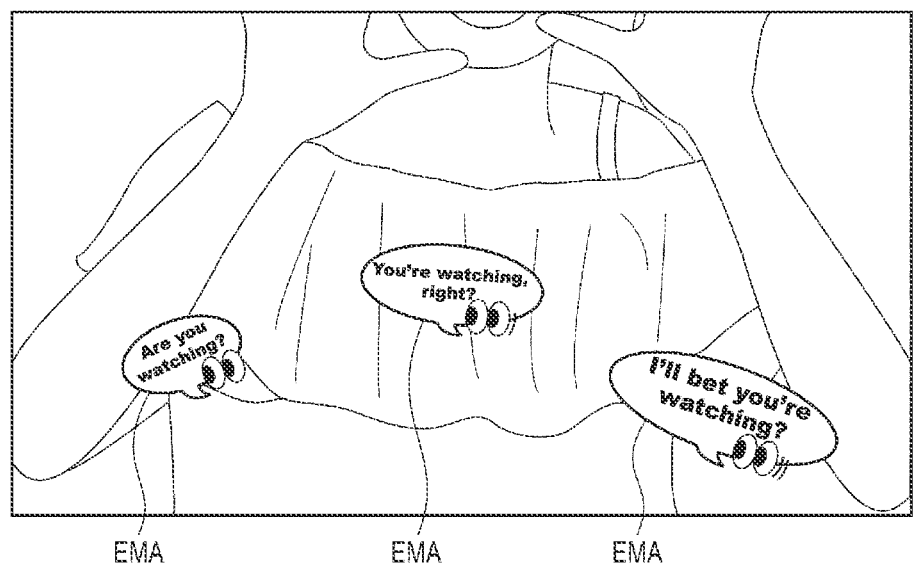
FIG. 11 schematically illustrates a display example of an emote image for the broadcaster displayed on a part of the display screen of the viewer terminal.

FIG. 11 schematically illustrates a display example of a broadcaster emote image displayed on a part of the display screen of the viewer terminal.

In this example, a part of the first area 100 is illustrated and broadcaster emote images EMA composed of balloon graphics with the text "Are you watching?", "You are watching, aren't you?", "I'll bet you're watching?", and the like are introduced to the video content.

For example, when there are few viewer comments and emote images EM regarding video content the distributor is distributing, the distributor can introduce a broadcaster emote image EMA of a balloon graphic with the text "Are you watching?" requesting viewers to introduce emote images EM such as the text "I'm watching". The broadcaster emote image EMA of a balloon graphic with the text "Are you watching?" noted therein can, for example, be set with the motion of being suspended from the top of the display screen for a prescribed period and disappear after the prescribed period.

Figure 12:
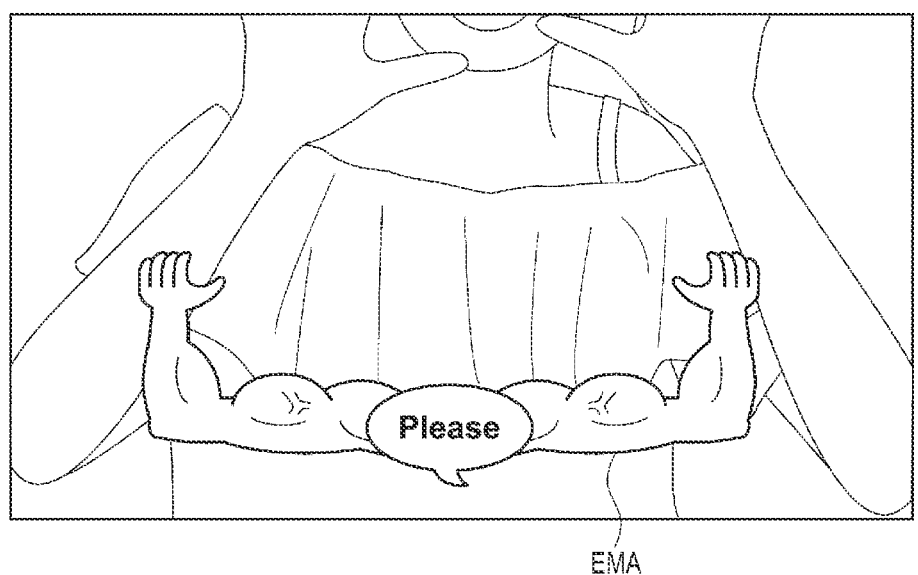
FIG. 12 schematically illustrates a display example of an emote image for the broadcaster displayed on a part of the display screen of the viewer terminal.

FIG. 12 schematically illustrates a display example of a broadcaster emote image displayed on a part of the display screen of the viewer terminal. In this example a part of the first area 100 is illustrated and a broadcaster emote image EMA of a balloon with the text "Please" noted and arms extending from both sides is introduced in the video content.

For example, when requesting the viewers to introduce emote images EM to the video content the broadcaster is broadcasting, the broadcaster can introduce a broadcaster emote image EMA with the text "Please" to request viewers to introduce emote images EM. A broadcaster emote image EMA that is a balloon graphic with the text "Please" noted is displayed, for example, at the bottom of the display screen. When an emote image EM introduced from a viewer terminal 20 has a motion of falling from the upper portion, the arms of the broadcaster emote image EMA captures the emote image EM. For example, the broadcaster emote image EMA can be set to only be displayed on the display screen for a prescribed period and to disappear after the prescribed period elapses.

In FIG. 3 to FIG. 12 described above, display examples of the viewer terminal 20 based on video data for distribution supplied from the video distributing device 30 were described but display examples on the viewer terminal 20 are not limited to this.

Figure 13:
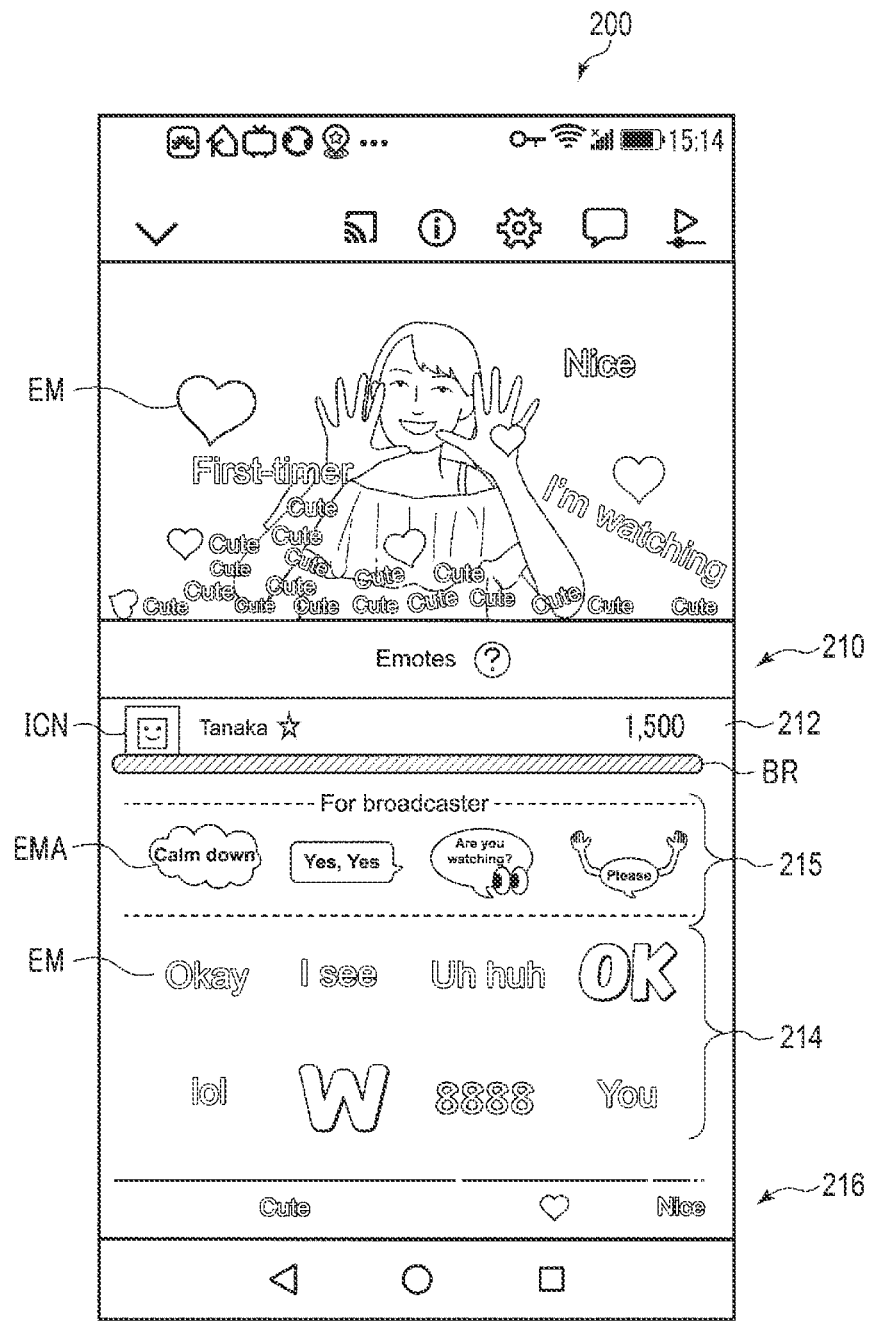
FIG. 13 is a diagram schematically illustrating another display example of a content viewer terminal distributed to in real time.

FIG. 13 is a diagram schematically illustrating another display example of a content viewer terminal distributed to in real time. Here, a display example is schematically illustrated for the case the viewer terminal 20 is a mobile terminal such as a smartphone or tablet terminal.

In the display example of FIG. 13, a third area 200 including a portion where the video content is displayed and a fourth area 210 where a list of the emote images EM are presented to the viewer are displayed side by side on the mobile terminal screen.

The third area 200 is a modification of the display form of the first area 100 illustrated in FIG. 3 and includes a portion where video content is displayed, a portion where operating buttons and a time bar are displayed, an input button for the viewer to input comments, and the like.

The fourth area 210 is a modification of the display form of the second area 110 illustrated in FIG. 3 and the fourth area 210 includes a charge display area 212 for displaying the charge amount, an emote list display area 214 for displaying a list of emote images EM, a broadcaster emote list display area 215 for displaying a list of broadcaster emote images EMA, and a history display area 216 for displaying a history of the emote images EM that have been introduced.

The display elements included in the third area 200 and fourth area 210 are the same as the display example of the case where the viewer terminal 20 is a personal computer so the description is omitted here.

Mobile terminals such as a smartphone or tablet terminal have a sensor for detection positions on the display screen contacted by the viewer and this enables the viewer to select an emote image EM to introduce to the video content by selecting an emote image EM presented in the emote list display area 214 using a finger or touch pen.

Figure 14:
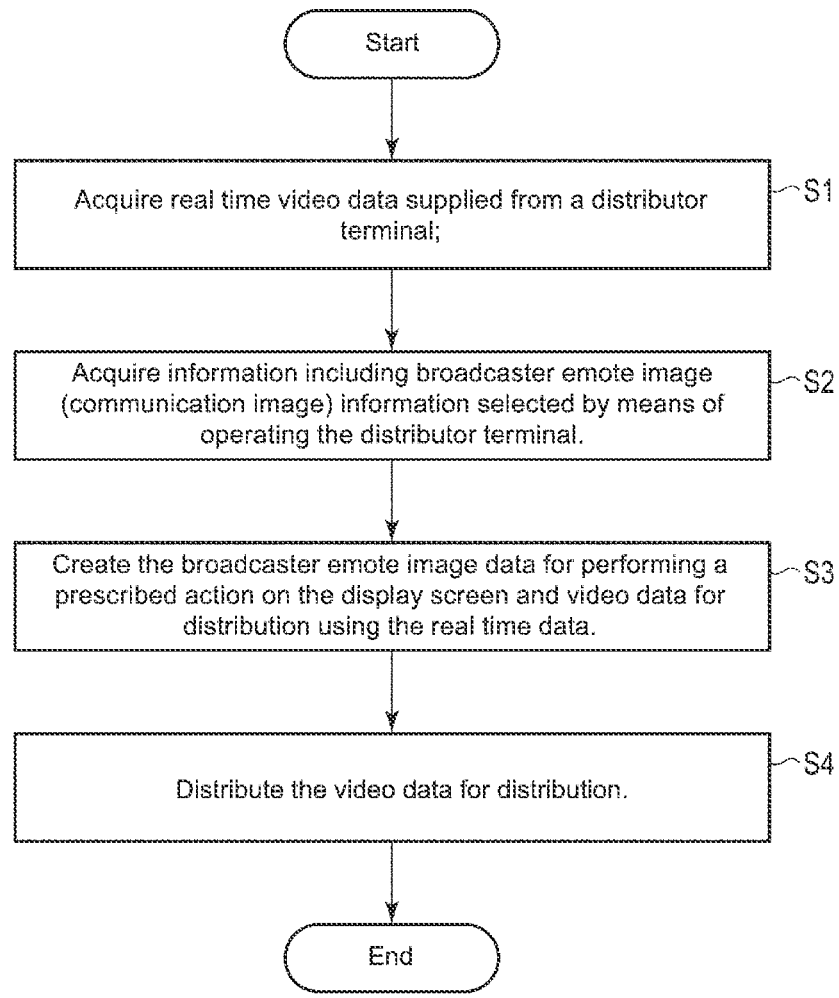
FIG. 14 is a flowchart describing an example of the video distribution method for the video distributing device of an Embodiment.

FIG. 14 is a flowchart describing an example of the video distribution method for the video distributing device of Embodiment 1.

With the video distributing device 30, the first acquiring part 321 acquires real time video data supplied from the distributor terminal 10 (step S1).

The second acquiring part 322 acquires input information including broadcaster emote image (communication image) EMA information selected by the distributor operating the distributor terminal 10 (step S2).

Next, the generating part 34 receives real time video data from the first acquiring part 321 and receives distributor terminal 10 input information from the second acquiring part 322. The generating part 34 can identify the broadcaster emote image EMA to be introduced based on the identification information of the broadcaster emote image EMA included in the input information from the distributor terminal 10.

In addition, the generating part 34 can receive a distribution request and input information from the viewer terminal 20 via the receiving part 32. The generating part 34 can identify the viewer or viewer terminal 20 and what the viewer is viewing using the distribution request and input information from the viewer terminal 20. In addition, the generating part 34 can identify the emote images EM introduced to the video content being viewed by the viewer based on the emote image EM identification information included in the input information.

Using display information generated by the charge amount management part 36, the generating part 34 can generate emote video data for distribution where the broadcaster emote image EMA performs a prescribed action on the display screen of the viewer terminal 20 and distributor terminal 10 and can generate video data for distribution using the emote video data and real time video data for distribution (step S3).

The distributing part 38 receives video data for distribution from the generating part 34 and based on control of the distribution controller 35, distributes video data for distribution to the viewer terminal 20 and distributor terminal 10 from which a distribution request has been received (step S4).

As has been described above, the video distributing device, video distributing method, and recording media of the present Embodiment facilitate bidirectional communication between distributors distributing live broadcast video content and viewers thereof and can provide a service that enlivens the video content.

Next, a video distributing device, video distributing method, and recording media according to Embodiment 2 will be described in detail with reference to the drawings. Note, in the following description, the same reference codes are provided to the same configurations of Embodiment 1 described above and their descriptions are omitted.

In the video distributing device of the present Embodiment, operation of the charge amount management part 36 is different from that of Embodiment 1 described above.

In the present Embodiment, in the operation by the viewer of selecting and introducing an emote image EM while viewing live broadcast video content, the length of the operating time of a long press of a mouse with the cursor positioned on the emote image EM and pressure exerted on the display screen during the operation of contacting the emote image EM with a fingertip, touch pen, or the like are supplied from the viewer terminal 20 to the video distributing device 30 as input information.

In addition, in the operation of the distributor selecting and introducing emote images EM and broadcaster emote images EMA while distributing live broadcast video content, the length of time of a long press of a mouse with the cursor positioned on the emote image EM or broadcaster emote image EMA and the pressure exerted on the display screen during the operation of contacting the emote image EM or broadcaster emote image with a fingertip, touch pen, or the like are supplied from the distributor terminal 10 to the video distributing device 30 as input information.

Note, the information of the pressure exerted on the display screen through the operation of the viewer or distributor may be the pressure detected by a pressure sensor of the viewer terminal 20 or the distributor terminal 10 or may be a contact surface area value when the viewer or distributor contacts the display screen of the viewer terminal 20 or distributor terminal 10 with a fingertip. The charge amount management part 36 may be configured to enable calculating the pressure value during the operation based on the contact surface area value during the operation supplied from the viewer terminal 20 or distributor terminal 10.

Figure 15:
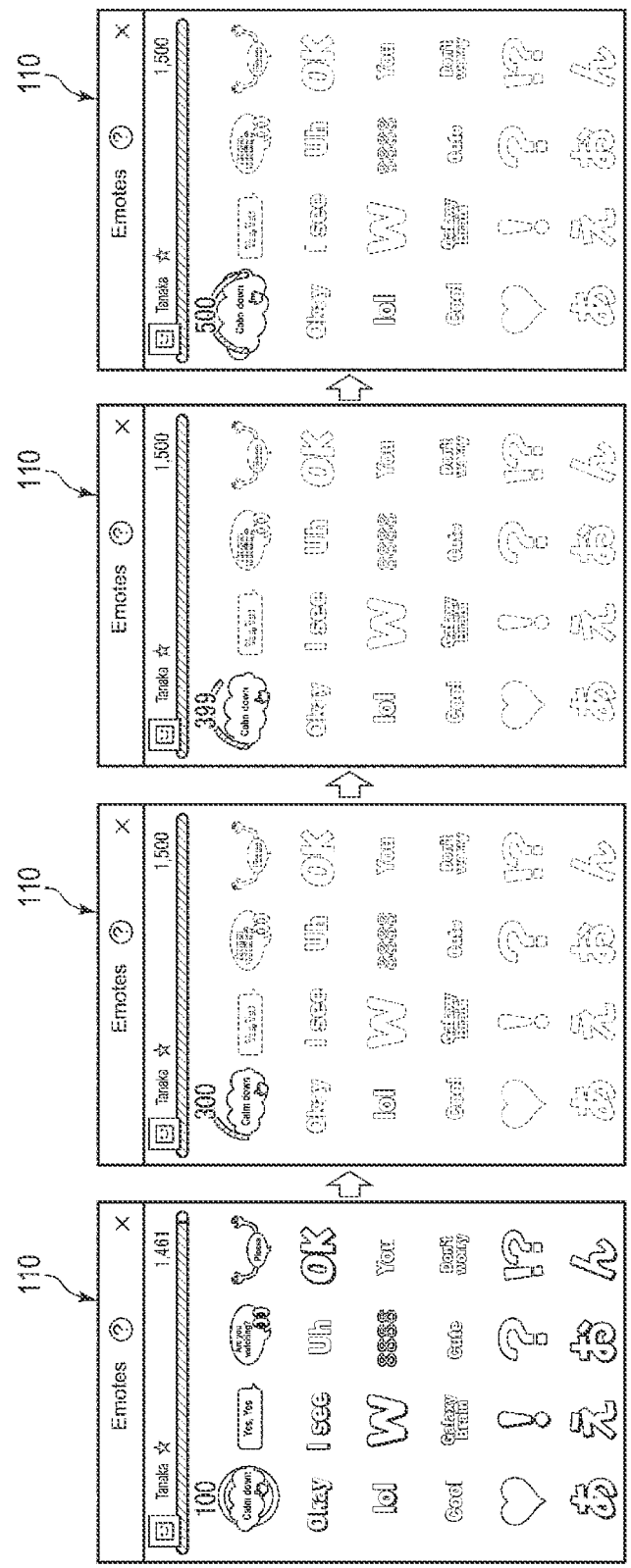
FIG. 15 is an explanatory diagram of an operation example of the distributor terminal when an emote image is posted in real time to content that is being distributed.

FIG. 15 is an explanatory diagram of an example of operation of the viewer terminal displaying content distributed in real time.

Here, an example is described for the case where the broadcaster emote image EMA with the text "Calm down" is selected from this list of broadcaster emote images EMA displayed in the second area 110 (or fourth area 210) of the distributor terminal 10 display screen.

The distributor can adjust the charge amount consumed by the selected broadcaster emote image EMA according to the length of time of a mouse click or screen contact or the pressure exerted on the screen during operation.

The charge amount management part 36 of the video distributing device 30 can change the display status of the second area 110 (or fourth area 210) of the distributor terminal 10 based on length of time of operation or pressure during operation information included in the input information from the distributor terminal 10. For example, when the distributor aligns the cursor on the broadcaster emote image EMA with the text "Calm down" and clicks (or makes contact using a fingertip, touch pen, or the like), the broadcaster emote image EMA with the text "Calm down" is selected. The charge amount consumed and a circular shaped (or arc shaped) bar graph indicating the level of charge amount consumed are displayed on the broadcaster emote image EMA.

FIG. 15 illustrates the state of change of charge amount consumed by the selected broadcaster emote image EMA as four stages. When the operation time length or pressure during the operation included with the input information is at a first threshold or less, the charge amount consumed is set to "100" and the charge amount management part 36 can generate display information displaying "100" near the broadcaster emote image EMA composed of the text "Calm down" and display a circular bar graph surrounding the broadcaster emote image EMA.

When the operation time length or pressure during operation included in the input information is greater than the first threshold, the charge amount management part 36 can set the charge amount consumed to a value exceeding "100" according to the operation time length or pressure value. With, for example, an initial charge amount value consumed of "100" and a maximum value "500" set when the operation time length or pressure exceeds a second threshold (>first threshold), the charge amount management part 36 may set the charge amount so as to change continuously from the initial value to the maximum value according to the operation time length or pressure value or may provide a plurality of thresholds between the first threshold and the second threshold and set so as to increase the charge amount consumed in stages (for example, "100", "200", . . . "500") (non-continuously) when the operation time length or pressure value exceeds the threshold.

According to the charge amount consumed, the charge amount management part 36 can change the charge amount consumed displayed near the broadcaster emote image EMA in the second area 110 (or the fourth area 210) and can generate display information for changing the length of an arc shaped bar graph displayed along a circle surrounding the broadcaster emote image EMA.

In addition, according to the charge amount value consumed, the charge amount management part 36 may generate display information changing the size of the selected broadcaster emote image EMA in the second area 110 (or fourth area 210). In the example illustrated in FIG. 15, when the charge amount consumed increases, the display size of the selected broadcaster emote image EMA also increases.

The generating part 34 can generate video data for distribution based on the display information generated in the charge amount management part 36 and can change the size or action of the broadcaster emote image EMA according to the size of the broadcaster emote image EMA charge amount (or the operation time length or pressure value) and can introduce the image to the video content.

Note that FIG. 15 illustrates a display example of when the broadcaster emote image EMA composed of the text "Calm down" is selected but cases where other broadcaster emote images EMA or emote images EM are selected are the same. In addition, in the case of the viewer selecting an emote image EM using the viewer terminal 20, the charge amount consumed and size and action of the emote image EM can be adjusted according to the operation time length or pressure value of the viewer in a similar manner.

Figure 16:
FIG. 16 illustrates a part of a display example of the viewer terminal illustrated in FIG. 15.

FIG. 16 illustrates a part of a display example of the viewer terminal illustrated in FIG. 15.

Here, only the charge amount consumed and the circular shaped or arc shaped bar graph image are displayed on the broadcaster emote image EMA selected by the distributor. The distributor can select a broadcaster emote image EMA or emote image EM other than the text "Calm down" and the charge amount management part 36 can adjust the charge amount consumed according to the operation time length or pressure during operation by the viewer for other broadcaster emote images EMA or emote images EM as well.

Figure 17:
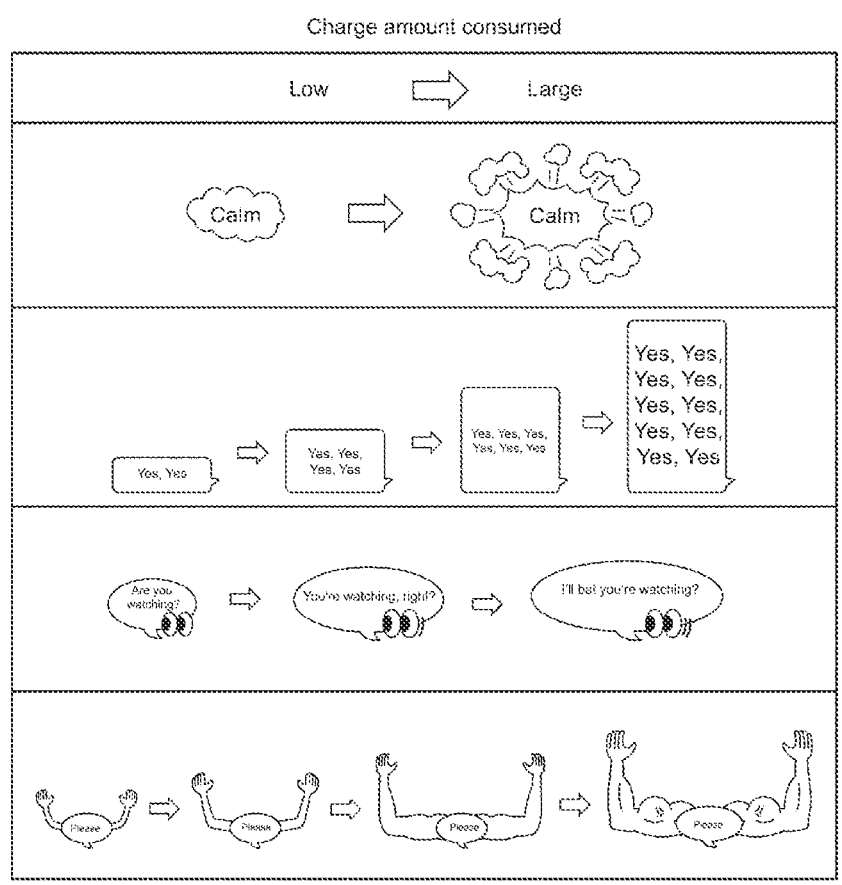
FIG. 17 is a diagram indicating the relationship between the emote images for broadcasters that can be posted by the distributor and the charge amount to be consumed.

FIG. 17 is a diagram indicating the relationship between the emote images for broadcasters that can be posted by the distributor and the charge amount to be consumed.

The generating part 34 can generate video data for distribution based on the display information generated in the charge amount management part 36 and can change the size or action of the broadcaster emote image EMA according to the size of the broadcaster emote image EMA charge amount (or the operation time length or pressure value) and can introduce the image to the video content.

For the size and motion of the broadcaster emote image EMA, for example, size can be set small for low charge amounts and set larger as charge amount consumed increases.

For example, for the broadcaster emote image EMA composed of the text "Calm down", when the charge amount consumed is low, the size of the image can be set small and the action of blowing away other emote images EM around the image can also be set small while if the charge amount consumed is large, the size of the image can be set large and the action of blowing away other emote images EM around the image can also be set large.

For example, for the broadcaster emote image EMA composed of the text "Yes, yes", if the charge amount is low, the size of the image can be set small and only a few other emote images EM are pushed outside of the display screen by the image. If the charge amount consumed is large, the size of the image can be set large and a large number of other emote images EM are pushed outside the display screen by the image.

For example, if the charge amount consumed for the broadcaster emote image EMA composed of the text "Are you watching?" or the broadcaster emote image EMA composed of the text "Please" is low, the size of the images is set small and the appeal to viewers will be subdued. When the charge amount consumed is large, the size of the image is set large, strengthening the appeal to viewers.

Other than that described above, the video distributing device 30 of the present Embodiment is the same as that for Embodiment 1.

In other words, the video distributing device, video distributing method, and recording media of the present Embodiment facilitate bidirectional communication between distributors distributing live broadcast video content and viewers thereof and can provide a service that enlivens the video content.

Note, the present invention is not limited to the Embodiments described above and various modifications can be made at the implementation stage without departing from the scope of the present invention. In addition, suitable combinations of the various Embodiments can be made, and various combined effects can be obtained. Furthermore, various inventions are included in the Embodiments described above and various inventions can be extracted through selecting and combining a plurality of disclosed configuration elements. For example, if in the case of some configuration elements being deleted from all of the configuration elements indicated in the Embodiments, a problem is resolved and an effect is obtained, the configuration with these configuration elements deleted can be extracted as an invention.

EXPLANATION OF CODES

10. Distributor terminal, 20. Viewer terminal, 30. Video distributing device, 32. Receiving part, 34. Generating part, 35. Distribution controller, 36. Charge amount management part, 38. Distributing part, 100. First area, 110. Second area, 112, 212. Charge display area, 114, 214. Emote list display area, 116, 216. History display area, 200. Third area, 210. Fourth area, 321. First acquiring part, 322. Second acquiring part, 323. Third acquiring part, EM. Emote image (second communication image), EMA. Broadcaster emote image, G1 to G5, BR. Graph

The invention claimed is:

1. A video distributing device, comprising:
a first acquiring part configured to acquire real time video data supplied from a distributor terminal;
a second acquiring part configured to acquire first input information containing a first communication image selected by a distributor terminal operation;
a third acquiring part configured to acquire second input information containing a second communication image selected by a viewer terminal operation;
a generating part configured to generate motion information for displaying mutual interactions of the first communication image and the second communication image based on performing prescribed motions on a display screen according to the laws of classical mechanics; and
a distributing part configured to distribute video data containing the first communication image, second communication image, motion information, and real time video data to the viewer terminal and the distributor terminal,
wherein the first communication image and second communication image comprise images for expressing emotes or ideas of a viewer or distributor using text or colors, and
wherein the motion information comprises current position, travel direction, speed, rotation, rotation speed, shape of the first communication image or a portion thereof, and shape of the second communication image or a portion thereof.

2. The video distributing device according to claim 1, wherein the generating part further includes:
a charge amount management part configured to allocate a charge amount to each distributor that operates the distributor terminal for each real time video data distributed to viewer terminals, and when the charge amount consumed for displaying a communication image is less than the current charge amount allocated to the distributor, consumes the charge amount allocated to the distributor and generates display information for displaying the communication image,
wherein the video data for distribution further includes the display information.

3. The video distributing device according to claim 2, wherein
the input information includes the time length that the distributor terminal was operated or the pressure on the screen when the distributor terminal was operated and identification information of the communication image;
the charge amount management part is configured to consume a number value according to the time length or pressure information from the charge amount and configured to generate display information containing the time length or pressure information; and
the generating part is configured to change the motion or size of the communication image according to the time length or pressure.

4. The video distributing device according to claim 2, wherein
the charge amount management part is configured to manage a communication image post history during a time from start to end of distributing the video data in real time based on the input information.

5. The video distributing device according to claim 1, wherein
the first input information includes identification information of the first communication image; and
the video data for distribution includes motion information to enable the first communication image to move corresponding to the identification information upon being displayed on the viewer terminal.

6. A video distributing method, comprising:
acquiring real time video data supplied from a distributor terminal;
acquiring first input information containing a first communication image selected by a distributor terminal operation;
acquiring second input information containing a second communication image selected by a viewer terminal operation
generating motion information for displaying mutual interactions of the first communication image and the second communication image based on performing prescribed motions on a display screen according to the laws of classical mechanics; and
distributing video data for distribution containing the first communication image, the second communication image, motion information, and the real time video data to a viewer terminal and the distributor terminal,
wherein the first communication and second communication image comprise images for expressing emotes or ideas of a viewer or distributor using text or colors, and
wherein the motion information comprises current position, travel direction speed, rotation, rotation speed, shape of the first communication image or a portion thereof, and shape of the second communication image or a portion thereof.

7. The video distributing method of claim 6, wherein said real time video data supplied from the distributor terminal is acquired by a first acquiring function of a video distribution program stored on a non-transitory computer readable medium, wherein said first input information containing the first communication image is acquired by a second function of the video distribution program stored on the non-transitory computer readable medium, wherein said second input information containing a second communication image is acquired by a third function of the video distribution program stored on the non-transitory computer-readable medium, and wherein the video data for distribution is distributed by a distribution function of the video distribution program stored on the non-transitory computer readable medium.

8. A video distributing device, comprising:
a first acquiring part configured to acquire real time video data supplied from a distributor terminal;
a second acquiring part configured to acquire first input information containing a first communication image selected by a viewer terminal operation;
a generating part configured to generate motion information for distribution using data from the first communication image, wherein the generating part performs a predetermined operation on a display screen of the viewer terminal; and
a distribution part configured to distribute the motion information,
wherein the first communication image comprises an image for expressing emotes or ideas of a viewer or distributor using text or colors,
wherein the motion information comprises current position, travel direction, speed, rotation, rotation speed, shape of the first communication image or a portion thereof, and shape of the second communication image or a portion thereof,
wherein the first input information includes the time length that the viewer terminal was operated and the pressure on the screen when the viewer terminal was operated and identification information of the first communication image,
wherein the generating part further includes a charge amount management part configured to allocate a charge amount to each viewer that operates the viewer terminal for each real time video data distributed to viewer terminals,
wherein, when the charge amount consumed for displaying the first communication image is less than the current charge amount allocated to the viewer, the charge management part is further configured to consume the charge amount allocated to the viewer and further to generate display information for displaying the first communication image,
wherein the charge amount management part is further configured to consume a number value according to the time length and pressure information from the charge amount allocated to the viewer,
wherein the display information further includes the time length and pressure information, and
wherein the generating part is further configured to change the motion or size of the first communication image according to the time length and pressure information.

9. The video distributing device according to claim 8, wherein the charge amount management part increases a value of the charge amount according to a lapse of time so that the charge amount recovers from 0 to a maximum value after a predetermined time elapses.

10. The video distributing device according to claim 8, wherein
the input information includes identification information of the first communication image; and
the video data for distribution includes motion information to enable the first communication image to move corresponding to the identification information upon being displayed on the viewer terminal.

11. The video distributing device according to claim 8, wherein
the charge amount management part is further configured to manage a communication image post history during a time from start to end of distributing the video data in real time based on the first input information.

12. The video distributing device according to claim 8, further comprising:
a third acquiring part configured to acquire second input information in order to erase the first communication image,
wherein the first communication image is prohibited from being input, a displayed transparency of the first communication image is adjusted, the duration of a display time of the first communication image is adjusted, and a second communication image for a distributor performing a predetermined operation is input.

13. A video distributing method, comprising:
acquiring real time video data supplied to a viewer terminal;
acquiring first input information containing a first communication image selected by a viewer terminal operation;
acquiring second input information containing a second communication image selected by a viewer terminal operation;
generating motion information for displaying mutual interactions of the first communication image and the second communication image based on performing prescribed motions on a display screen of the viewer terminal according to the laws of physics; and
distributing video data for distribution containing the first communication image, second communication image, motion information, and real time video data to the viewer terminal and a distributor terminal,
wherein the first communication image and second communication image comprise images for expressing emotes or ideas of a viewer or distributor using text or colors, and
wherein the motion information comprises current position, travel direction, speed, rotation, rotation speed, shape of the first communication image or a portion thereof, and shape of the second communication image or a portion thereof.

14. The video distributing method of claim 13, wherein said video data supplied from the distributor terminal is acquired by a first acquiring function of a video distribution program stored on a non-transitory computer readable medium,
wherein said first input information containing the first communication image is acquired by a second function of the video distribution program stored on the non-transitory computer readable medium,
wherein said motion information is generated by a generating function of the video distribution program stored on the non-transitory computer readable medium, and
wherein the video data for distribution is distributed by a distribution function of the video distribution program stored on the non-transitory computer readable medium.

* * * * *